United States Patent Office 3,446,067
Patented May 27, 1969

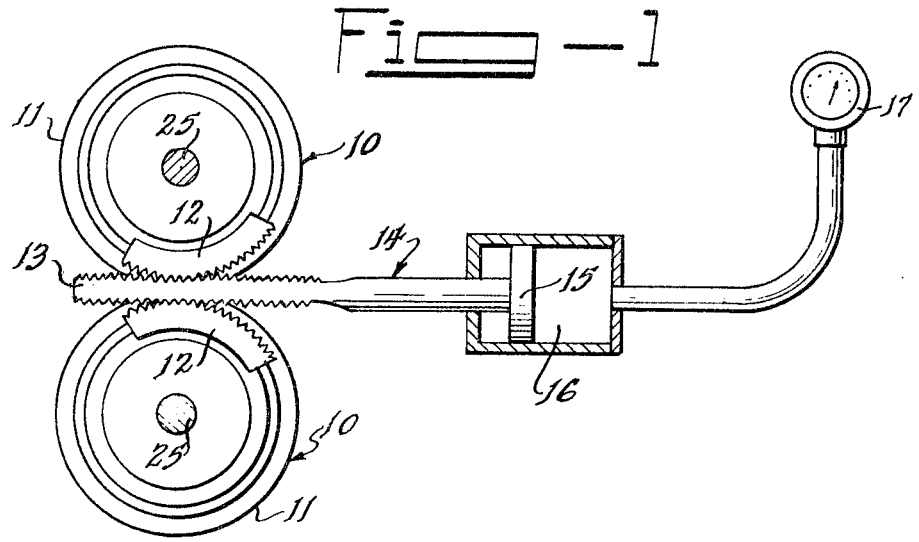
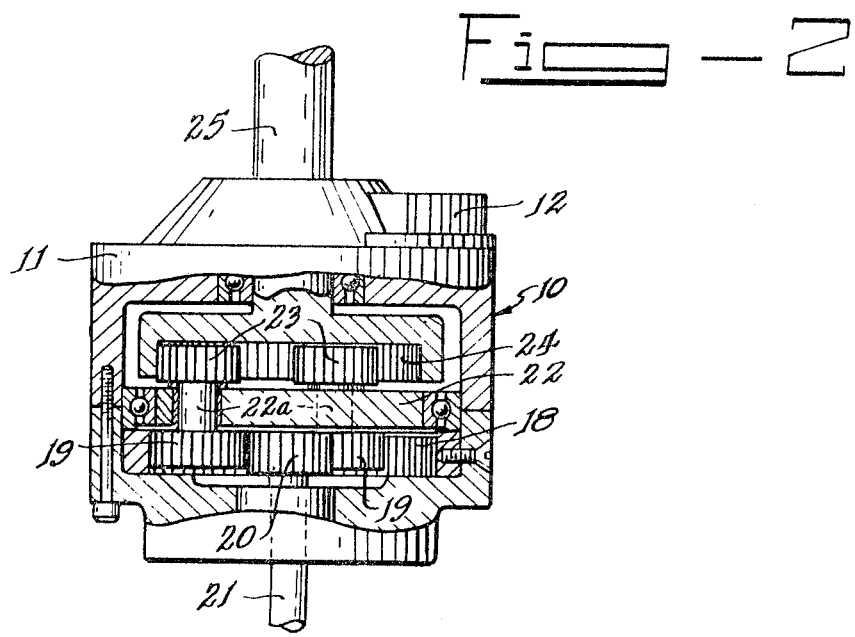

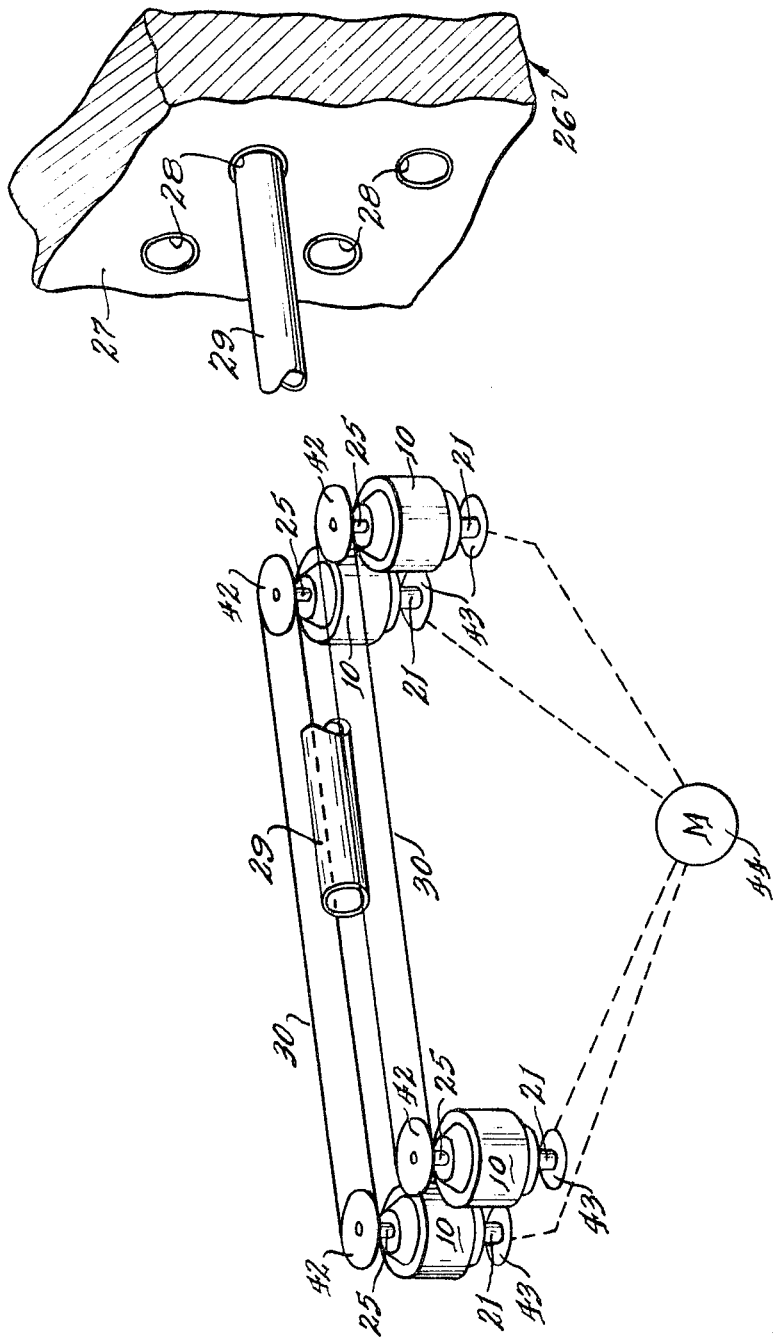

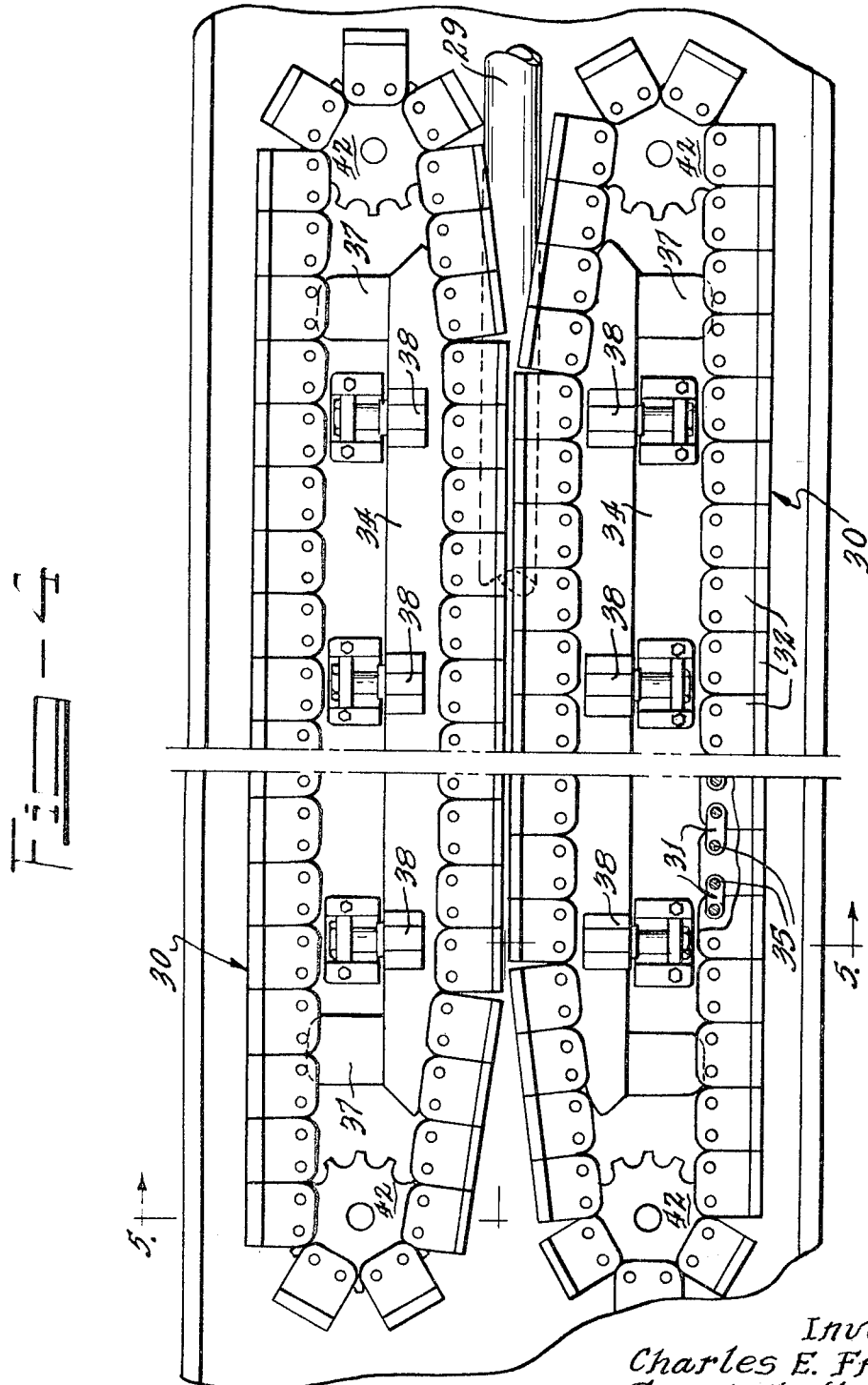

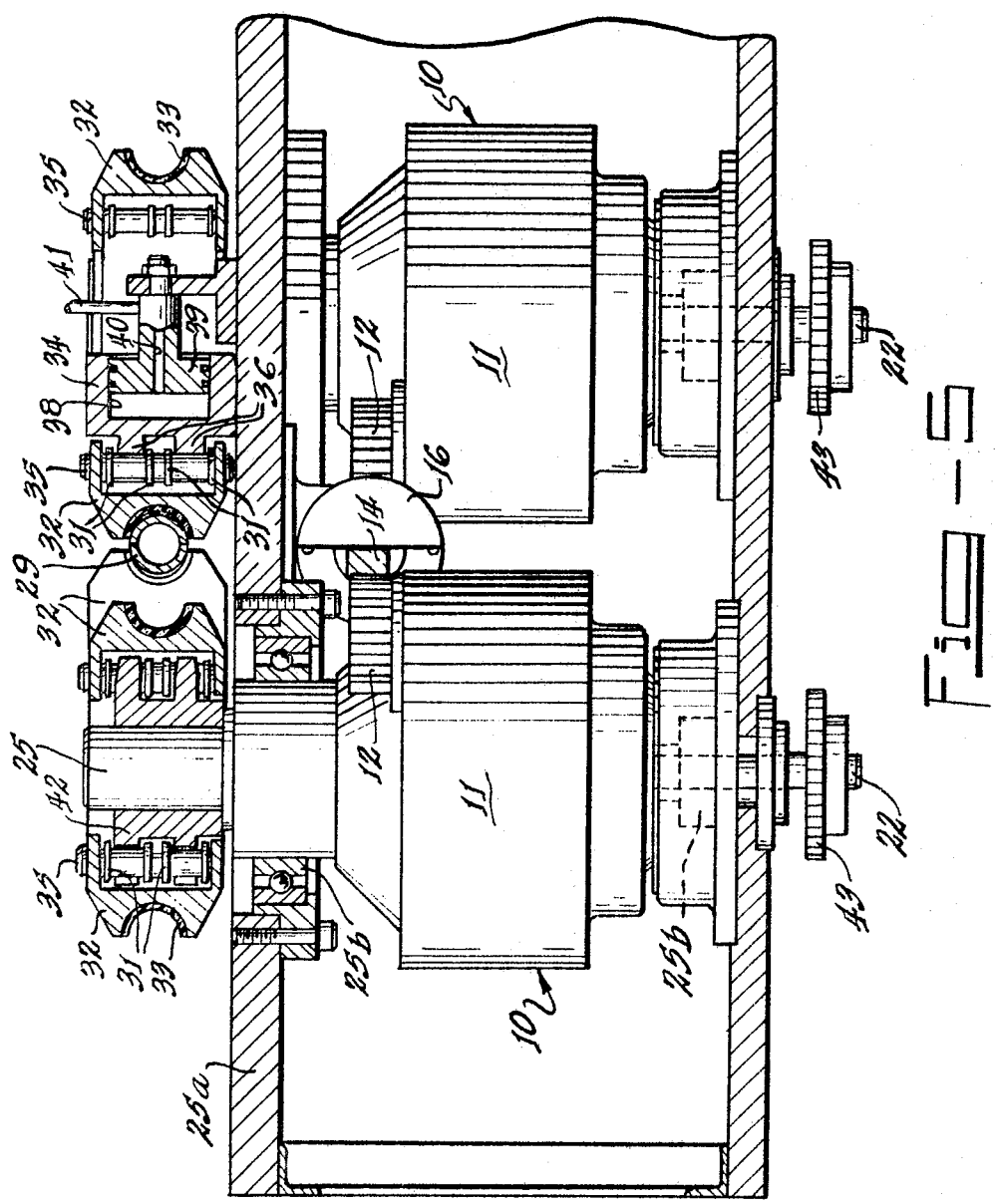

3,446,067
FORCE READOUT SYSTEM
Charles E. Frantz and Frank F. Vlacil, Richland, Wash., assignors to the United States of America as represented by the United States Atomic Energy Commission
Filed Feb. 13, 1967, Ser. No. 616,435
Int. Cl. G01l 5/12
U.S. Cl. 73—141                                          4 Claims

ABSTRACT OF THE DISCLOSURE

A force-readout system employing the rotative reaction on a normally non-rotative member in a drive mechanism for indicating the force transmitted by the drive mechanism. Repair or replacement is performed at a reactor tube by force-applying loops driven by planetary transmissions; normally nonrotative members of which are made capable of slight angular movement which indicates the force transmitted by the force-applying loops at the reactor tube.

*Contractual origin of the invention*

The invention described herein was made in the course of, or under a contract with the United States Atomic Energy Commission.

*Background of the invention*

This invention relates to a force-readout system. More specifically, the invention relates to a force-readout system adapted for use with an apparatus for applying pushing or pulling forces.

It has been found desirable to push or pull a tool for repairing a nuclear reactor at a damaged process tube or to push a new process tube into the reactor, by means of force-applying loops engaging opposite sides of the tube or a pole to which the tool is connected. It is difficult to determine how much force is being applied by such loops.

*Summary of the invention*

According to the present invention, a force readout is achieved by obtaining an indication of the rotative reaction on a normally nonrotatable element of a drive for a force-applying loop.

*Brief description of the drawings*

FIG. 1 is a plan view, partly in section, of the force-readout system of the present invention;
FIG. 2 is an elevation, partly in section, of a speed reducer to which the force-read-out system is applied;
FIG. 3 is a perspective diagrammatic view showing the operation of a tool for repairing a nuclear reactor by force-applying loops driven by speed reducers;
FIG. 4 is a plan view of the tool and the force-applying loops; and
FIG. 5 is a sectional view taken on the line 5—5 of FIG. 4.

*Description of the preferred embodiment*

As shown in FIG. 1, two speed reducers 10, placed side by side, have casings 11, to which arcuate gear segments 12 are attached. The gear segments 12 face one another and mesh with opposite sides of a toothed rack 13, which forms one end of a rod 14. Attached to the other end of the rod 14 is a piston 15, which is slidably mounted in an hydraulic cylinder 16. Motion of the piston 15 in the cylinder 16 is resisted by hydraulic fluid in the cylinder, acting against a Bourdon tube (not shown) in a gauge 17.

As shown in FIG. 2, the speed reducer 10 has a ring gear 18, which is attached to the inside of the casing 11 and has its interior meshing with a set of planetary gears 19. The planetary gears, which may be three in number, although only two are shown, are distributed about, and mesh with, a sun gear 20, fixed to an input shaft 21 so as to be rotated thereby. The planetary gears 19 lies to one side of a cage 22 and are rotatably mounted thereon by shafts 22a, which are secured to the planetary gears and are journalled in the cage 22. At the opposite side of the cage there is a second set of planetary gears 23, each of which is secured to one of the shafts 22a and thus to the associated planetary gear 19 so as to rotate therewith. The planetary gears 23 are distributed about, and mesh with, the interior of a ring gear 24, which is fixed to an output shaft 25. The output shaft, the input shaft 21, and the cage 22 are rotatably mounted in the casing 11.

For example, the sun gear 20 may have 16 teeth; each planetary gear 19, 12 teeth; the ring gear 18, 40 teeth; each planetary gear 23, 11 teeth; and the ring gear 24, 38 teeth. With these numbers, the ratio of the speed of the input shaft 21 to that of the output shaft 25 is $$\frac{1+\left(\frac{40}{12}\times\frac{12}{16}\right)}{1-\left(\frac{40}{12}\times\frac{11}{38}\right)}=99.75$$

As shown in FIG. 5, the casing 11 is rotatably mounted in a framework 25a by means of bearings 25b. In spite of the fact that the ring gear 18 is secured to the rotatably mounted casing 11, the ring gear may be termed the normally stationary member of the speed reducer 10 and is stationary or nonrotatable except for a very small amount of movement permitted by its connection, through casing 11, gear segment 12, toothed rack 13, and rod 14, with the piston 15, which has a small amount of movement with respect to the cylinder 16. The load on the output shaft 25 is transmitted back through the gears 24, 23, and 19 to the ring gear 18 as a rotating force and on to the piston 15 as an axial force. The displacement of the piston 15 in the cylinder 16 is proportional to the load on the output shaft 25. The gauge 17 provides a reading of the displacement of the piston 15 and thus of the load on the output shaft 25.

As shown in FIG. 3, the force-readout system of the present invention may be used on a reactor 26 comprising a mass 27 of graphite and a plurality of spaced parallel process tubes 28, for replacing process tubes or for removing fuel elements stuck in the process tubes. A tube-splitting tool (not shown) or a pushing element (not shown) enters the reactor 26 on one end of a long pole 29, the other end of which is clamped between two elongated loops 30.

As shown in FIG. 4, each loop 30 comprises a plurality of sprocket links 31 and a plurality of clamps 32 alternating with the sprocket links and connected to one another thereby. As shown in FIG. 5, each clamp 32 has an arcuate recess lined with rubber as indicated at 33 for frictionally engaging one side of the pole 29. The facing sides of the loops 30 engage the pole 29 at opposite sides and are pressed toward one another against the pole 29 by long shoes 34, which are adjustably mounted within the loops 30 to vary the grip exerted by the loops on the pole.

As shown in FIGS. 3 and 4, the links 31 are pivotally connected to the clamps 32 by pins 35, which include roller portions engaged by spaced longitudinal ribs 36 on each shoe 34. Each shoe engages the interior of the side of one of the loops 30 for the major portion of its length, which side is adjacent the other loop 30. The interior of the opposite side of each loop 30 is engaged near its ends by transverse ears 37 formed on the ends of each shoe 34; more particularly, each ear 37 has spaced ribs (not shown) engaging the roller portions of the pins 35 of the associated loop, in the manner that the ribs 36 on the shoes 34 engage the roller portions of the pins 35. Each shoe has five transversely extending cylinders 38 attached thereto, which are spaced from one another along the shoe. The cylinders 38 and thus each shoe 34, are slidably mounted on fixed pistons 39. Fluid under pressure is supplied to each cylinder 38 through a passage 40 in the associated piston 39 and a line 41 connected thereto. The pressure fluid supplied to the cylinders 38 is used to adjust the cylinders 38 with respect to the pistons 39 and thus to press the shoes 34 against the loops 30 to obtain the desired grip of the pole 29 by the loops 30. When the shoes 34 are moved away from the adjacent sides of the loops 30 for releasing the pole 29 therefrom, the slack in the loops 30 is taken up by movement of the ears 37 of the shoes 34 against the other sides of the loops 30.

As shown in FIG. 3, four speed reducers 10 are provided, two at the ends of each loop 30, and drive through their four output shafts 25 four sprockets 42, which drive the loops 30. The sprockets 42 are keyed to the shafts 25 and drive the loops 30 by engaging the pins 31 at their roller portions. Two sprockets 42 are in the ends of each loop 30. Two sprockets 42 are needed for each loop 30 so that there is at all times a pulling force applied to the facing sides of the loops 30. Thus the loops may be used to push the pole 29 toward the reactor 26 or to pull the pole away from the reactor. The input shafts 21 of the speed reducers 10 are driven by sprockets 43 on the shafts, which sprockets are in turn driven by an air motor 44.

Thus, there are two speed reducers 10 at one set of adjacent ends of the force-applying loops 30 and two more speed reducers 10 at the other set of adjacent ends of the force-applying loops 30. The two speed reducers 10 shown in FIG. 1, together with the associated read-out parts comprising gear segments 12, rod 14, piston 15, cylinder 16, and gage 17, are at one set of adjacent ends of loops 30. It is to be understood there is another corresponding set of read-out parts (not shown) associated with the two speed reducers 10 located at the other set of adjacent ends of the loops 30. Thus, with reference to FIG. 3, the force exerted by the loops 30 in pushing the rod 29 toward the reactor 26 is indicated by the one set of read-out parts, and the force exerted by the loops 30 in pulling the rod 29 away from the reactor is indicated by the other set of read-out parts.

It is to be understood that the loops 30 may directly engage a process tube 28 for moving it into place in the graphite mass 27.

The embodiments of the invention in which an exclusive property or privilege is claimed are defined as follows:

1. An assembly comprising:
   a first planetary gear;
   a sun gear meshing with the first planetary gear;
   an input shaft connected to the sun gear for simultaneous rotation therewith;
   a nonrotatable ring gear whose interior engages the first planetary gear for causing rotation of the first planetary gear and revolution about the sun gear to occur simultaneously;
   an output shaft;
   a rotatable ring attached to the output shaft for simultaneous rotation therewith;
   a second planetary gear secured to the first planetary gear in axially spaced relation thereto, said second planetary gear meshing with the interior of the rotatable ring gear so that revolution of the first planetary gear about the sun gear causes rotation of the output shaft;
   means for yieldingly holding the nonrotatable ring gear against rotation comprising a casing enclosing and attached to the nonrotatable ring gear and an arcuate gear segment attached to the exterior of the casing;
   indicating means for using the yield of the last-mentioned means to indicate load applied to the output shaft; and
   a toothed rack meshing with the gear segment and connected with the indicating means.

2. The assembly specified in claim 1, the indicating means comprising a hydraulic cylinder, a piston slidably mounted therein, a gauge connected to the cylinder, and a rod having one end connected to the piston and the other end formed as the toothed rack.

3. The assembly specified in claim 1 and further comprising an additional assembly like that specified in claim 1 except for the toothed rack and the indicating means, the casing of claim 1 and the casing of the additional assembly being side by side, the arcuate gear segments being attached to facing sides of the casings and meshing with opposite sides of the single toothed rack, the assembly of claim 4 further comprising two loops extending side by side and being driven by the two output shafts, and a pole arranged between the loops so as to be clamped thereby and moved longitudinally along the loops, the indicating means indicating the load applied by the loops to push or pull the pole.

4. The assembly specified in claim 3 and further comprising two long shoes, one extending within each loop for substantially the length thereof and engaging the interior of the side of the loop adjacent the other loop and means acting against the shoes to make them push the adjacent sides of the two loops toward one another against the pole, said last mentioned means comprising a plurality of cylinders attached to the shoes so as to extend transversely thereof and to be spaced from one another along the loops, a plurality of fixed pistons slidably mounting the cylinders, and means for supplying pressure fluid between the cylinders and the pistons for moving the cylinders with respect to the pistons.

References Cited

UNITED STATES PATENTS

| 2,251,291 | 8/1941 | Reichelt | 254—29 XR |
| 2,365,443 | 12/1944 | Angst | 73—136 |
| 2,724,266 | 11/1955 | Baker et al. | 73—136 |
| 2,988,153 | 6/1961 | Haworth et al. | 73—136 XR |
| 3,234,786 | 2/1966 | Christenson et al. | 73—136 |

FOREIGN PATENTS 658,756  10/1951  Great Britain.

CHARLES A. RUEHL, Primary Examiner.

U.S. Cl. X.R.

73—136; 176—36; 254—29